United States Patent [19]

Wheller

[11] Patent Number: 5,025,467
[45] Date of Patent: Jun. 18, 1991

[54] CELLULAR TELEPHONE RING ANNUNCIATOR

[75] Inventor: Wayne D. Wheller, Surrey, Canada

[73] Assignee: Hescor Canada Ltd., New Westminster, Canada

[21] Appl. No.: 151,977

[22] Filed: Feb. 3, 1988

[51] Int. Cl.$^5$ .............................................. H04M 1/00
[52] U.S. Cl. ........................................ 379/60; 379/374
[58] Field of Search ............... 379/373, 374, 372, 375, 379/58, 59, 60; 340/384 E

[56] References Cited

U.S. PATENT DOCUMENTS

| | | | |
|---|---|---|---|
| 4,076,968 | 2/1978 | Wattenbarger | 379/373 |
| 4,214,131 | 7/1980 | Bush et al. | 379/375 |
| 4,603,317 | 7/1986 | Gailbreath et al. | 340/384 E |
| 4,890,315 | 12/1989 | Bendixen et al. | 379/59 |

FOREIGN PATENT DOCUMENTS 0082540  4/1986  Japan ..................... 379/58

OTHER PUBLICATIONS

Cherry Semiconductor CS-8204, CS-8205, Telephone Tone Rinder Data Sheet, pp. 70, 71, 72, 1986.
Cherry Semiconductor CS-8205, Tone Ringer, Applications Note.
National Semiconductor LM-383 8 Watt Audio Power Amplifier Data Sheet, p. 57.
Dynatac 6000x Universal Mobile-Telephone, Motorola © 1984.

Primary Examiner—James L. Dwyer
Attorney, Agent, or Firm—Bull, Housser & Tupper

[57] ABSTRACT

An apparatus for producing an audible sound to indicate the occurrence of an incoming telephone call on a cellular telephone. The apparatus has a first circuit for producing a first waveform having a first voltage and a first frequency. The apparatus also has a second circuit for producing a second waveform, the second circuit being operably connected to the first circuit, thereby receiving the first waveform. The second waveform has a second voltage and a second frequency wherein the second frequency is proportional to the first voltage of the first waveform. The apparatus also has an amplifier for amplifying the second waveform to produce an amplified waveform, the amplifier being operably connected to receive the second waveform. The apparatus also has a sound generator for producing an audible sound from the amplified waveform wherein the sound generator is operably connected to receive the amplified waveform. The apparatus further has an enable circuit for enabling the audible sound to be produced in response to the incoming telephone call.

13 Claims, 1 Drawing Sheet

CELLULAR TELEPHONE RING ANNUNCIATOR

FIELD OF THE INVENTION

This invention relates to a telephone ring annunciator for use in a vehicle fitted with a cellular telephone, the annunciator being required when the vehicle is left unattended.

BACKGROUND OF THE INVENTION

A cellular telephone is a very convenient business accessory which permits use of a radio operated telephone in a motor vehicle. The cellular telephone is equipped with an annunciator circuit coupled to a small loudspeaker or equivalent, which circuit is triggered by a "ringing signal" in the radio signal received by the telephone. The small loudspeaker or equivalent generates an adequate sound signal when the vehicle is being driven, or the vehicle driver/occupant is close to the car in a quiet area. However, if the driver/occupant is some distance from the car, that is the car is being left unattended, sometimes in a noisy area, the normal ringing sound or signal from the cellular telephone will be inaudible and the incoming call will be lost. The problem of how to signal the occurrence of an incoming telephone call when the vehicle is left unattended is usually solved by an installer. Invariably, the installer will connect the vehicle's horn directly to the cellular telephone. Thus, when the vehicle is left unattended and an incoming call is received, the cellular telephone will cause the vehicle's horn to sound. Using the vehicle's horn to signal an incoming call can be disadvantageous because in some vehicles the horn will not operate if the vehicle's ignition circuit is not energized.

Also, for the installer to wire the horn to the cellular telephone, modifications to the vehicle wiring must be made which can void the car's warranty. Car buyers may be reluctant to void their warranty and therefore may not be able to enjoy all the benefits of a cellular telephone.

In addition, car horns generally emit an offensive sound often startling or annoying persons standing nearby. In fact, because of the offensive sound emitted by car horns, some municipalities will not allow the use of horns, sirens or bells to be used to signal an incoming call on a cellular telephone. Persons wishing to use cellular telephones in these areas must have some alternate way of signalling an incoming call when away from their vehicle.

SUMMARY OF THE INVENTION

The present invention reduces the difficulties of the prior art by providing a device which generates an unoffensive, unannoying, pleasant telephone ringing sound, sometimes known as a "warble", upon the occurrence of an incoming call on a cellular telephone. The device is easy to install without requiring modification of any existing vehicle wiring as in the prior art, thereby avoiding any vehicle warranty conflicts. The sounds emitted by the invention are sufficiently loud so as to be heard when some distance from the car, but are at a frequency which is reasonably pleasant to the human ear so as not to startle persons standing near the vehicle when a call is received. The invention is not a horn, siren or bell and therefore may be allowed in municipalities restricting those devices.

An apparatus according to the invention includes first means for producing a first waveform having a first voltage and a first frequency. The apparatus also includes second means for producing a second waveform, the second means being operably connected to the first means thereby receiving the first waveform. The second waveform has a second voltage and a second frequency wherein the second frequency is proportional to the first voltage of the first waveform. The apparatus also includes amplifying means for amplifying the second waveform to produce an amplified waveform, the amplifying means being operably connected to receive the second waveform. The apparatus also includes third means for producing an audible sound from the amplified waveform wherein the third means is operably connected to receive the amplified waveform. The apparatus further includes an enable circuit which is adapted to be connected to the cellular telephone for enabling the audible sound to be produced in response to an incoming telephone call on a cellular telephone.

DESCRIPTION OF THE PREFERRED EMBODIMENTS

Figure 1:
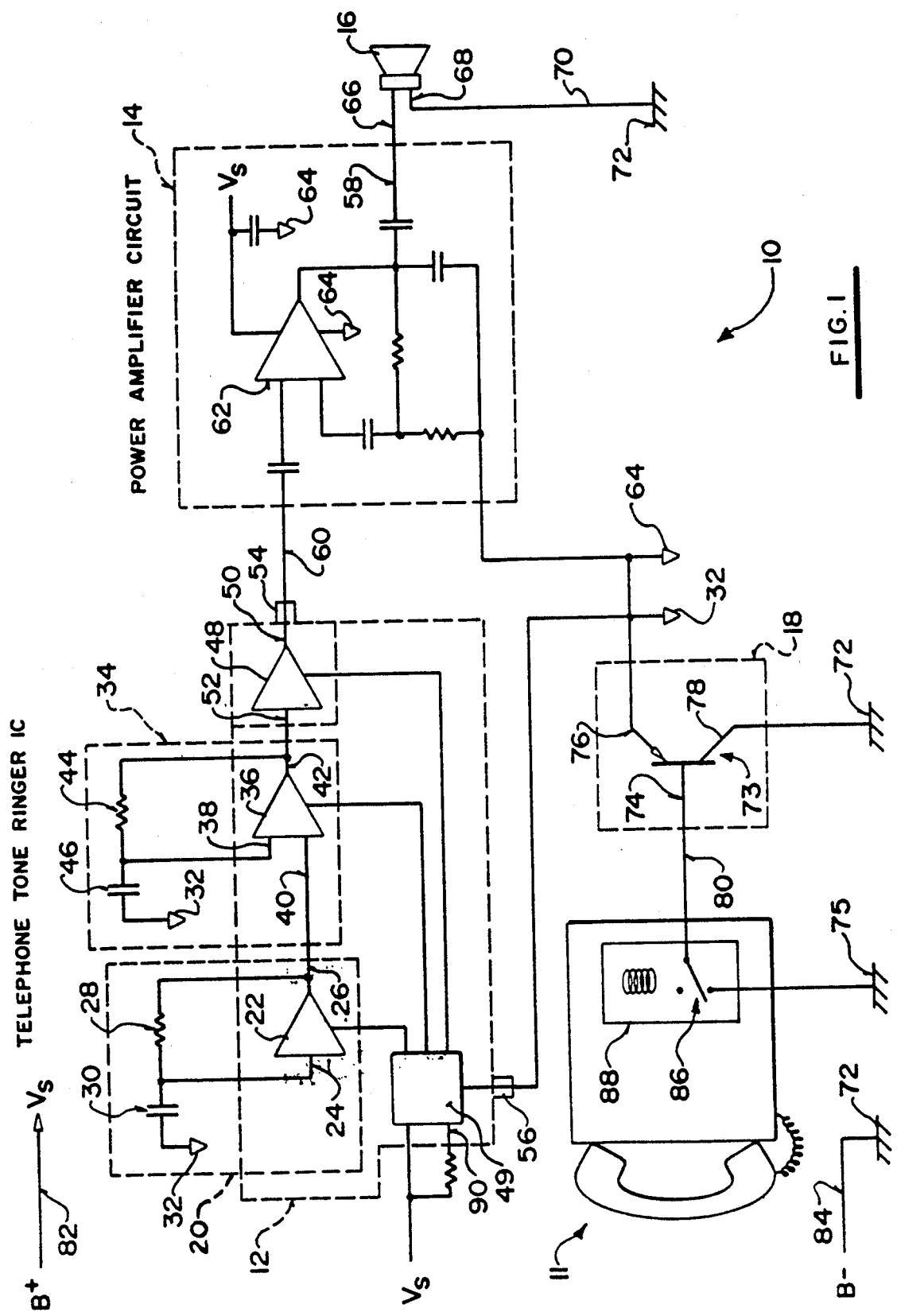
FIG. 1 is a circuit diagram of the electrical apparatus.

FIG. 1 shows a circuit diagram of an electrical apparatus for producing an audible sound in response to a control signal from a cellular telephone 11. The apparatus 10 comprises a Cherry Semiconductor 8204 telephone tone ringer integrated circuit shown generally within a broken outline area designated 12, a power amplifier circuit shown generally within a broken line area designated 14, a public address horn loudspeaker 16, and an enable circuit shown generally within a broken line area designated 18.

The integrated circuit 12 is used to implement a low frequency oscillator which is shown generally within a broken line area designated 20 and which provides first means for producing a first waveform having a first voltage and a first frequency. The low frequency oscillator 20 includes a first amplifier 22 having a first input 24 and a first output 26 with a first resistor 28 connected therebetween by means for connecting such as a printed wiring board (PWB). Additionally, a first capacitor 30 is connected by the printed wiring board between the first input 24 and a first signal ground 32.

The first resistor and first capacitor cooperate to determine the first frequency of the first waveform. Values for the first resistor and first capacitor on the order of 173 Kilohms and 0.47 uF. respectively, render the first waveform having a first frequency of approximately 10 Hz. The first waveform appears at the first output 26 of the first amplifier 22.

The integrated circuit 12 is also used to implement second means for producing a second waveform, in the form of a voltage-to-frequency converter which is shown within a broken line area designated 34. The voltage-to-frequency converter 34 receives the first waveform from the low frequency oscillator 20 and produces the second waveform having a second voltage and a second frequency, the second frequency being proportional to the first voltage of the first waveform.

The voltage-to-frequency converter 34 includes a first operational amplifier 36 having a first inverting input 38, a first non-inverting input 40 and a first operational output amplifier 42. A second resistor 44 is connected between the first operational amplifier output 42 and the first non-inverting input 38 by the printed wiring board. A second capacitor 46 is similarly connected between the first non-inverting input 40 and the first signal ground 32 by the printed wiring board. The first output 26 of the first amplifier 22 is connected within the integrated circuit 12 directly to the first inverting input 40 of the first operational amplifier 36.

The second resistor 44 and the second capacitor 46 cooperate to determine the second frequency of the second waveform. Values for the second resistor 44 and second capacitor 46 of the order of 191 Kilohms and 0.0068 uF. respectively render the second waveform having a second frequency which is within a range from 508 Hz. to 635 Hz. As the first voltage of the first waveform varies, the voltage-to-frequency converter 34 varies the second frequency of the second waveform proportionally. The second waveform appears at the first operational amplifier output 42 of the first operational amplifier 36.

The integrated circuit 12 further includes a second amplifier 48 providing buffering means for buffering the second waveform to produce a buffered waveform. The second amplifier 48 has a second output 50 and a second input 52. The second input 52 is connected within the integrated circuit 12 directly to the first operational amplifier output 42 for receiving the second waveform.

The second waveform is amplified and buffered by the second amplifier 48 to produce the buffered waveform at the second output 50. The buffered waveform appearing at the second output 50 is available to the user at a first output pin 54 extending from the integrated circuit 12.

Within the integrated circuit 12 a common ground connection is made to the first amplifier 22, the first operational amplifier 36 and the second amplifier 48. A power supply circuit 49 within the integrated circuit 12 controls the common ground connection and in this application, is programmed to permanently complete this common ground connection. The common ground connection is made available to the user by a ground pin 56 extending from the integrated circuit 12. The ground pin 56 is connected by the printed wiring board to the first signal ground 32.

The power amplifier circuit 14 included in the apparatus has a third output 58 and a third input 60. The third input 60 is connected by the printed wiring board to the first output pin 54 of the integrated circuit thereby enabling transmission of the buffered waveform to the third input 60 of the power amplifier circuit 14. The Power amplifier circuit 14 amplifies the buffered waveform to produce an amplified waveform. The amplified waveform appears at the third output 58.

The power amplifier circuit 14 comprises an LM-383 audio power operational amplifier 62 with ancilliary resistors and capacitors connected to implement a non-inverting AC power amplifier as is known in the art. Each of the components comprising the AC power amplifier circuit having a signal ground connection is connected by the printed wiring board to a single point which defines a second signal ground 64.

The public address horn loudspeaker 16 has a signal terminal 66 and a ground terminal 68. The signal terminal 66 is connected to the third output 58 to receive the amplified waveform. The ground terminal 68 is connected directly by a first wire 70 to a first ground connection 72 of a power source. The public address horn loudspeaker 16 provides third means for producing an audible sound from the amplified waveform.

The enable circuit 18 comprises a PNP transistor 73 having a base 74, an emitter 76 and a collector 78, the transistor providing means for connecting the first and second signal grounds 32 and 64 to the first ground connection 72 of the power source. The enable circuit further comprises a second wire 80, connected to the printed wiring board, providing means for connecting the base 74 to receive a second ground connection 75 or an open circuit from the cellular telephone 11. The first signal ground 32 and the second signal ground 64 are connected to the emitter 76, the PWB providing means for connecting the emitter 76 to the first and second signal grounds 32 and 64. The printed wiring board further provides means for connecting the collector to the first ground connection 72.

In the preferred embodiment, the integrated circuit 12, the power amplifier circuit 14, the enable circuit 18 and ancilliary components are mounted on a printed wiring board. The printed wiring board is shaped to have an outline which permits it to be installed in a housing at the rear of the public address horn loudspeaker 16. A suitable public address horn loudspeaker is manufactured by the American Equipment Company under model number SSH-31.

When installed as described, only three wires emanate from the housing, a power wire 82, the second wire 80, and a ground wire 84.

The power wire 82 is for connection to a positive terminal of a 12 volt power source such as a car battery to provide power to the apparatus 10. The ground wire 84 is for connection to a negative terminal of the 12 volt power source to provide a ground path from the first ground connection 72 of the printed wiring board to the power source.

The second wire 80 is for connection to a set of contacts 86 in a control relay 88 in the cellular telephone 11. The control relay 88 opens and closes the set of contacts 86 according to a four second ring and two second quiet sequence of the conventional telephone ring sequence, as is known in the art. The contacts 86 are closed during the four second ring period and open during the two second quiet period. When there is no incoming call, the contacts 86 are open and the second wire 80 is left "floating" (i.e. neither a definite high voltage level nor a definite low voltage level). When the contacts 86 are closed, during the ring period, the second wire 80 is connected to the second ground connection 75 at the cellular telephone 11.

OPERATION

When an incoming call occurs on the cellular telephone 11, the 4 second ring and 2 second quiet sequence is initiated. During the 4 second ring period the second ground connection 75 is made to the second wire 80 and the PNP transistor 73 beings to conduct, thereby essentially connnecting the emitter 76 and collector 78 together and hence making a connection between the first and second signal grounds 32 and 64 and the first ground connection 72. When such a connection is made, the low frequency oscillator 20, the voltage-to-frequency converter 34, the second amplifier 48 and the power amplifier circuit 14 begin to function, thereby enabling an audible sound to be produced by the public address horn loudspeaker 16.

During the 2 second quiet period, an open circuit appears on the second wire 80 and the PNP transistor 73 is shut off thereby placing an essentially high impedance between the emitter 76 and the collector 78 and isolating the first and second signal grounds 32 and 64 from the first ground connection 72. In this condition no audible sound is heard from the public address horn loudspeaker 16.

The 4 second ring period and 2 second quiet period repeats until either the cellular telephone 11 is answered or the incoming call is discontinued.

In an alternate embodiment of the invention, a trigger input 90 on the integrated circuit 12 may be used to control the operation of the apparatus 10. The use of the trigger input 90 would be an alternative to switching the first and second signal grounds 32 and 64 as described above.

The trigger input 90 may be employed by using an NPN transistor connected as a saturated switch as is known in the art. A base terminal of the transistor is connected directly to the relay contacts 86 by second wire 80. A collector terminal of the transistor is connected directly to the trigger input 90 of the integrated circuit. The first and second signal grounds 32 and 64 are connected together and be further connected to the first ground connection 72.

When the relay contacts 86 close, a high voltage level appears at the collector of the NPN transistor, thereby enabling the integrated circuit 12. When the relay contacts 86 open, a low voltage level appears at the collector of the NPN transistor, thereby disabling the integrated circuit 12. When the integrated circuit 12 is enabled, an audible sound will be produced at the loudspeaker 16. When the integrated circuit 12 is disabled, no audible sound will be heard at the loudspeaker 16.

The circuits described above are by way of Preferred example only and describe an embodiment of the invention using an integrated circuit having a buffer amplifier. Other circuits could be devised to accomplish the same purposes of the invention and may not require the use of a buffer amplifier as described herein.

I claim:

1. An apparatus for producing an audible sound to indicate the occurrance of an incoming telephone call on a cellular telephone, the apparatus comprising:
   (a) first means for producing a first waveform having a first voltage and a first frequency;
   (b) second means for producing a second waveform, the second means including a voltage to frequency converter, the voltage to frequency converter including a first operational amplifier having a fist inverting input, a first non-inverting input and a first operational amplifier output, a second resistor, means for connecting said second resistor between said first operational amplifier output and said first non-inverting input, a second capacitor, means for connecting said second capacitor between said first non-inverting input and a first signal ground, and wherein said second resistor and said second capacitor have parameters selected so that said second frequency has a nominal value in the range including 508 to 635 Hz;
   (c) amplifying means for amplifying said second waveform to produce an amplified waveform, said amplifying means being operably connected to receive said second waveform;
   (d) third means for producing an audible sound from said amplified waveform, said third means being operably connected to receive said amplified waveform;
   (e) an enable circuit interconnecting the cellular telephone and at least one of the following: said first means, said second means and said amplifying means, said enable circuit being operable to render the apparatus operative to produce said audible sound.

2. An apparatus for producing an audible sound to indicate the occurrance of an incoming telephone call on a cellular telephone, the apparatus comprising:
   (a) first means for producing a first waveform having a first voltage and a first frequency;
   (b) second means for producing a second waveform, said second means being operably connected to said first means thereby receiving said first waveform, said second waveform having a second voltage and a second frequency, said second frequency being proportional to said first voltage of said first waveform;
   (c) amplifying means for amplifying said second waveform to produce an amplified waveform, said amplifying means including a second amplifier having a second input and a second output, a power amplifier circuit having a third input and a third output, and means for connecting said second output to said third input, said amplifying means being operably connected to receive said second waveform;
   (d) third means for producing an audible sound from said amplified waveform, said third means being operably connected to receive said amplified waveform;
   (e) an enable circuit interconnecting the cellular telephone and at least one of the following: said first means, said second means and said amplifying means, said enable circuit being operable to render the apparatus operative to produce said audible sound.

3. An apparatus for producing au audible sound to indicate the occurrence of an incoming telephone call on a cellular telephone, the apparatus comprising:
   (a) an integrated circuit having:
      (i) first means for producing a first waveform having a first voltage and a first frequency, the first means for producing including a low frequency oscillator, the low frequency oscillator including a first amplifier having a first input, a first output, a first resistor, means for connecting said first resistor between said first input and said first output, a first capacitor, means for connecting said first capacitor between said first input and said first signal ground, said first resistor, first capacitor and first amplifier having parameters selected so that said fist frequency is approximately 10 Hz;
      (ii) second means for producing a second waveform, said second means being operably connected to said first means thereby receiving said first waveform, said second waveform having a second voltage and a second frequency, said second frequency being proportional to said first voltage of said first waveform;
      (iii) buffering means for buffering said second waveform to produce a buffered waveform said buffering means operably connected to receive said second waveform;
      (iv) a first signal ground operably connected to said first means, said second means, and said buffering means;
   (b) a power amplifier circuit of amplifying said buffered waveform to produce an amplified waveform, said power amplifier circuit operably connected to receive said buffered waveform, said power amplifier circuit having a second signal ground;

(c) third means for producing an audible sound from said amplified waveform, said third means operably connected to receive said amplified waveform;

(d) an enable circuit interconnecting the cellular telephone and at least one of the following:
said first means, said second means, and said amplifying means, said enable circuit being operable to render the apparatus operative to produce said audible sound.

4. An apparatus as claimed in claim 3 wherein said means for producing said second waveform comprises a voltage-to-frequency converter.

5. An apparatus as claimed in claim 4 wherein said voltage-to-frequency converter comprises:
(a) a first operational amplifier having a first inverting input, a first non-inverting input and a first operational amplifier output,
(b) a second resistor,
(c) means for connecting said second resistor between said first operational amplifier output and said first non-inverting input,
(d) a second capacitor,
(e) means for connecting said second capacitor between said first non-inverting input and said first signal ground,
(f) said first operational amplifier, said second resistor and said second capacitor having parameters selected so that said second frequency has a nominal value in the range including 508 to 635 HZ.

6. An apparatus as claimed in claim 3 wherein said buffering means comprises a second amplifier having a second input and a second output.

7. An apparatus as claimed in claim 3 wherein said power amplifier circuit has a third input and a third output.

8. An apparatus as claimed in claim 3 wherein said third means for producing an audible sound comprises a public address horn loudspeaker.

9. An apparatus as claimed in claim 3 wherein said enable circuit comprises means for connecting said first and second signal grounds to a first ground connection of a power source.

10. An apparatus as claimed in claim 9 wherein said means for connecting comprises:
(a) a PNP transistor having a base, an emitter, and a collector;
(b) means for connecting said base to receive a second ground or an open circuit condition;
(c) means for connecting said emitter to said first and second signal grounds;
(d) means for connecting said collector to said ground connection of said power source;
whereby a second ground connection received by said base causes said PNP transistor to conduct, thereby effectively connecting said first and second signal grounds to said first ground connection of said power source.

11. An apparatus for producing an audible sound to indicate the occurrence of an incoming telephone call on a cellular telephone, the apparatus comprising:
(a) first means for producing a first waveform having a first voltage and a first frequency;
(b) second means for producing a second waveform, said second means including a voltage-to-frequency converter, the voltage-to-frequency converter including a first operational amplifier having a first inverting input, a first non-inverting input and a first operational amplifier output, the voltage-to-frequency converter further including a second resistor, means for connecting said second resistor between said first operational amplifier output and said first non-inverting input, a second capacitor, means for connecting said second capacitor between said first non-inverting input and a first signal ground said second resistor and said second capacitor having parameters selected so that said second frequency has nominal value in the range including 508 Hz to 635 Hz, the voltage-to-frequency converter being operably connected to said first means thereby receiving said first waveform, said second wave form having a second voltage and a second frequency, said second frequency being proportional to said first voltage of said first waveform;

(c) amplifying means for amplifying said second waveform to produce an amplified waveform, said amplifying means being operably connected to receive said second waveform;

(d) third means for producing an audible sound from said amplified waveform, said third means being operably connected to receive said amplified waveform;

(e) an enable circuit interconnecting the cellular telephone and at least one of the following: said first means, said second means, and said amplifying means, said enable circuit being operable to render the apparatus operative to produce said audible sound.

12. An apparatus for producing an audible sound to indicate the occurrence of an incoming telephone call on a cellular telephone, the apparatus comprising:
(a) an integrated circuit having;
(i) first means for producing a first waveform having a first voltage and a first frequency;
(ii) second means for producing a second waveform, said second means including a voltage-to-frequency converter operably connected to said first means thereby receiving said first waveform, the voltage-to-frequency converter including a first operational amplifier having a first inverting input, a first non-inverting input and a first operational amplifier output, the voltage-to-frequency converter further including a second resistor, means for connecting said second resistor between said first operational amplifier output and said first non-inverting input, a second capacitor, means for connecting said second capacitor between said first non-inverting input and said first signal ground, said first operational amplifier, said second resistor and said second capacitor having parameters selected so that said second frequency has a nominal value in the range including 508 Hz to 635 Hz, said second waveform having a second voltage and a second frequency, said second frequency being proportional to said first voltage of said first waveform;
(iii) buffering means for buffering said second waveform to produce a buffered waveform said buffering means operably connected to receive said second waveform;
(iv) a first signal ground operably connected to said first means, said second means and said buffering means;

(b) a power amplifier circuit for amplifying said buffered waveform to produce an amplified waveform, said power amplifier circuit operably connected to receive said buffered waveform, said power amplifier circuit having a second signal ground;

(c) third means for producing an audible sound from said amplified waveform, said third means operably connected to receive said amplified waveform;

(d) an enable circuit interconnecting the cellular telephone and at least one of the following: said first means, said second means, and said amplifying means, said enable circuit being operable to render the apparatus operative to produce said audible sound.

13. An apparatus for producing an audible sound to indicate the occurrence of an incoming telephone call on a cellular telephone call, the apparatus comprising:

(a) an integrated circuit having;

(i) first means for producing a first waveform having a first voltage and a first frequency;

(ii) second means for producing a second waveform, said second means being operably connected to said first means thereby receiving said first waveform, said second waveform having a second voltage and a second frequency, said second frequency being proportional to said first voltage of said first waveform;

(iii) buffering means for buffering said second waveform to produce a buffered waveform said buffering means operably connected to receive said second waveform;

(iv) a first signal ground operably connected to said first means, said second means and said buffering means;

(b) a power amplifier circuit for amplifying said buffered waveform to produce an amplified waveform, said power amplifier circuit operably connected to receive said buffered waveform, said power amplifier circuit having a second signal ground;

(c) third means for producing an audible sound from said amplified waveform, said third means operably connected to receive said amplified waveform;

(d) an enable circuit including means for connecting said first and second signal grounds to a first ground connection of a power source, the means for connecting including:

(i) a PNP transistor having a base, an emitter, and a collector;

(ii) means for connecting said base to receive a second ground or an open circuit condition;

(iii) means for connecting said emitter to said first and second signal grounds;

(iv) means for connecting said collector to said ground connection of said power source; whereby a second ground connection received by said base causes said PNP transistor to conduct, thereby effectively connecting said first and second signal grounds to said first ground connection of said power source thereby rendering the apparatus operative to produce said audible sound.

* * * * *